June 19, 1923.
W. I. WHEELER
1,459,125
POWER TRANSMISSION MECHANISM
Filed Aug. 7, 1920
3 Sheets-Sheet 3
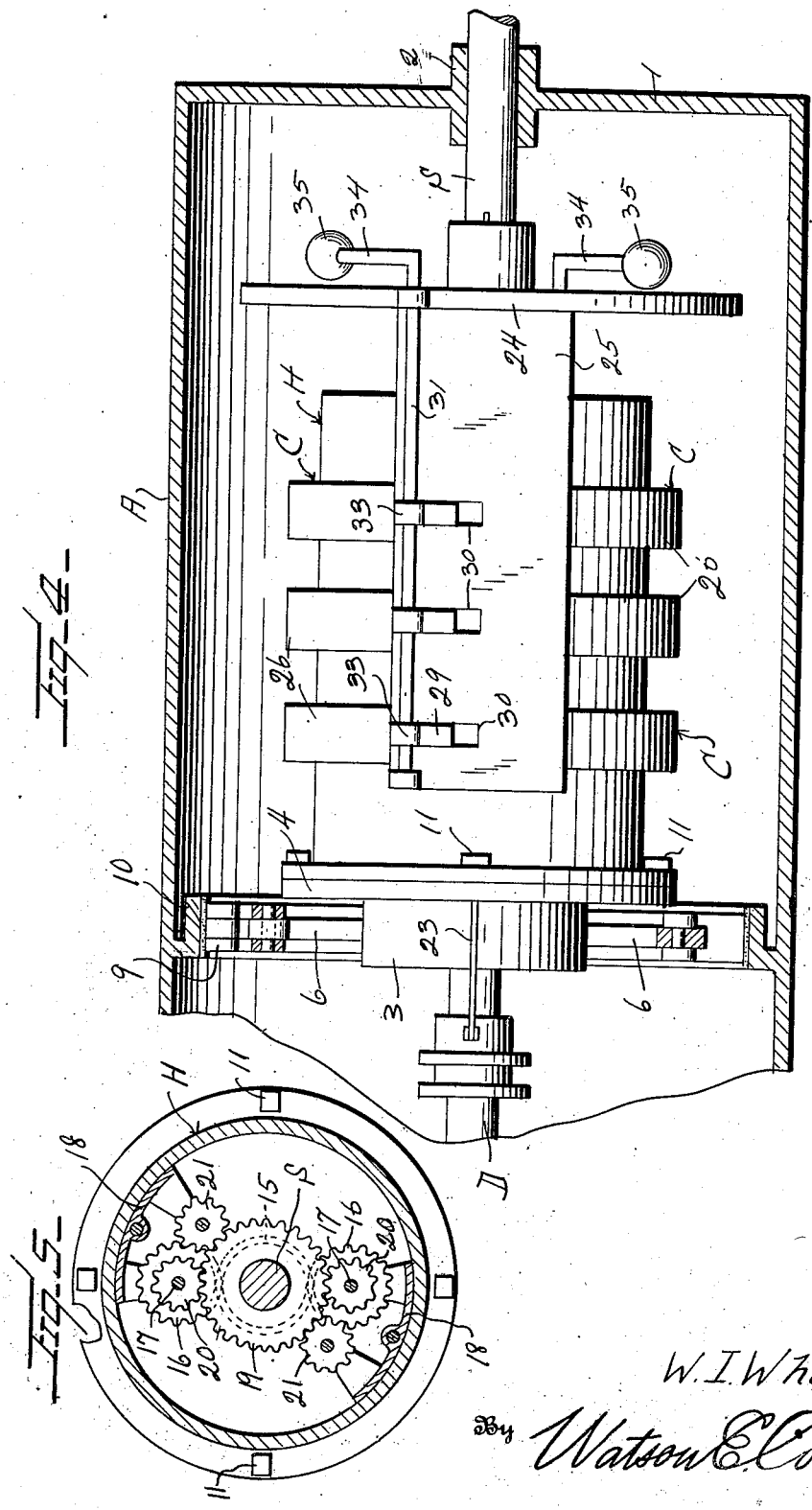
Inventor
W. I. Wheeler
By Watson E. Coleman
Attorney Patented June 19, 1923.

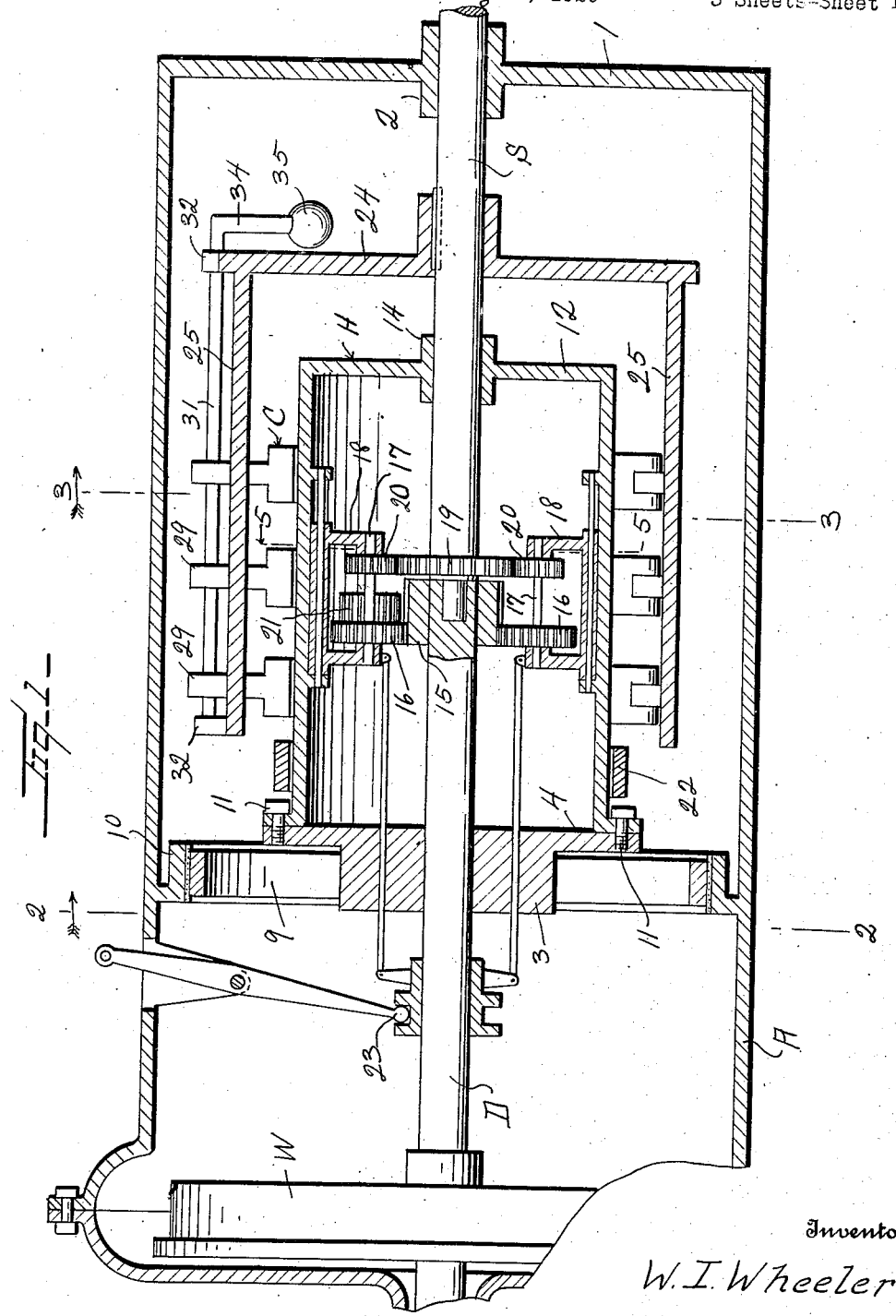

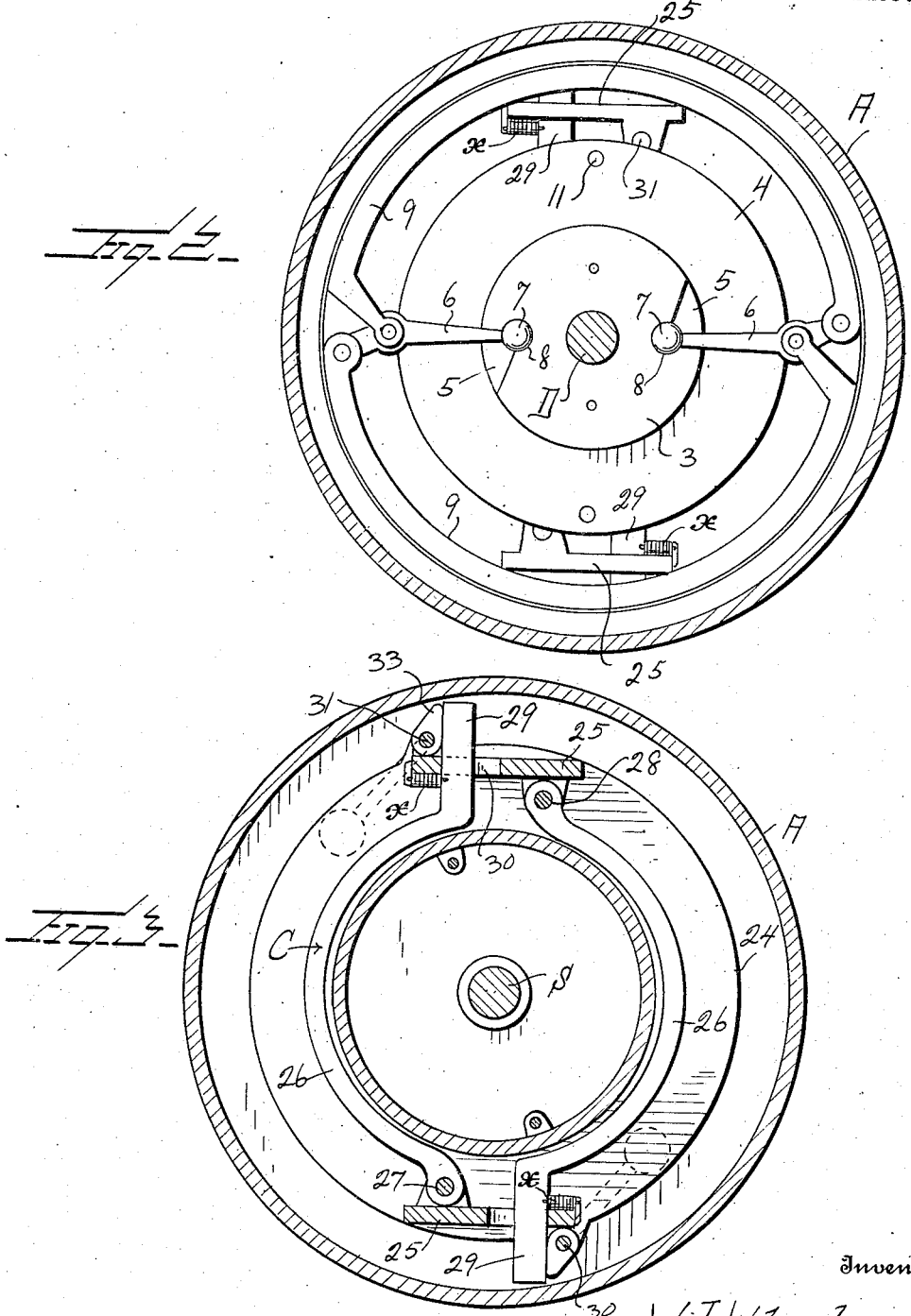

1,459,125

UNITED STATES PATENT OFFICE.

WILLIAM I. WHEELER, OF SCOTTVILLE, ILLINOIS.

POWER-TRANSMISSION MECHANISM.

Application filed August 7, 1920. Serial No. 401,893.

*To all whom it may concern:*

Be it known that I, WILLIAM I. WHEELER, a citizen of the United States, residing at Scottville, in the county of Macoupin and State of Illinois, have invented certain new and useful Improvements in Power-Transmission Mechanisms, of which the following is a specification, reference being had to the accompanying drawings.

This invention relates to certain improvements in power transmission mechanisms, and it is an object of the invention to provide a novel and improved mechanism of this general character wherein the speed of the driven shaft with respect to the driving shaft is automatically controlled and particularly in accordance with the engine load.

Another object of the invention is to provide a novel and improved mechanism of this general character embodying an operative connection between the driving and driven shafts including a member loosely mounted on the shafts, together with means for holding said member against rotation in one direction in unison with the shafts together with a clutching means rotating with one of said shafts and automatically operating to engage the member to cause the same to rotate in one direction in unison with the shafts.

An additional object of the invention is to provide a novel and improved mechanism of this general character wherein the member or housing comprised in the operative connection between the driving and driven shafts has coacting therewith a clutching means which, when in applied position, causes said member and shafts to rotate in unison and wherein said clutching means embodies a plurality of separable units each of which, when in gripping engagement with the member, is insufficient in itself to cause said member to rotate in unison with the shafts.

Furthermore, it is an object of the invention to provide a novel and improved mechanism of this general character wherein the clutching means for engaging the member or housing comprised in the operative connection between the driving and driven shafts is prevented from becoming unduly heated or worn.

A still further object of the invention is to provide a novel and improved mechanism of this general character wherein the clutching means engageable with the member or housing comprised in the operative connection between the driving and driven shafts consists of a plurality of separable units of a number sufficient to effect the requisite locking or holding of the housing or member when all of the units are in applied position but wherein a single unit in itself is insufficient to effect the requisite holding or locking of the housing or member.

It is also an object of the invention to provide a novel and improved mechanism of this general character including a member or housing comprised in the operative connection between the driving and driven shafts and wherein a clutching means coacts with said member or housing to lock or hold the same for rotation in unison with the shafts, said clutching means embodying a plurality of separable units so constructed and arranged to permit slipping of the member or housing without overheating the clutching units or imposing undue strain thereon and which slipping of the member or housing will occur before the units comprised in the clutching mechanism have engaged said member or housing in a manner to positively lock or hold the same for unitary rotation with the shafts and which provision permits a variation of speed of the driven shaft.

The invention consists in the details of construction and in the combination and arrangement of the several parts of my improved power transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in longitudinal section and partly in side elevation of a transmission mechansm constructed in accordance with an embodiment of my invention.

Figure 2 is a sectional view taken substantially on the line 2—2 of Figure 1, looking in the direction of the arrow.

Figure 3 is a sectional view taken substantially on the line 3—3 of Figure 1, looking in the direction of the arrow.

Figure 4 is a fragmentary view partly in top plan and partly in horizontal section of the mechanism as illustrated in Figure 1, and.

Figure 5 is a sectional view taken substantially on the line 5—5 of Figure 1, looking in the direction of the arrow.

As disclosed in the accompanying drawings, D denotes a driving shaft of a motor supported in a conventional manner and which has mounted thereon a fly wheel W, said wheel W being arranged within an enlarged end portion of an elongated and substantially cylindrical housing or casing A. The housing or casing A has the end thereof remote from the wheel W permanently closed by the head or wall 1.

The inserted end portion of the shaft D is operatively engaged with an inserted end portion of the driven shaft S, said shafts S being in longitudinal alinement with the shaft D and extending exteriorly of the housing or casing A through the bearing 2 provided in the closed end or head 1 thereof.

Loosely mounted upon the shaft D within the housing or casing A is a hub 3 of requisite diameter and which has its peripheral portion defined by an outstanding plate 4. At diametrically opposed points the periphery of the hub 3 is provided with sockets 5 from which extend the links 6. The inner ends of the links 6 are provided with the balls 7 seating in the supplemental sockets 8 so that the links 6 will be carried in a substantially radial position when the hub 3 rotates in one direction but will be automatically shifted to a position inclined to the radial when the hub 3 is shifted in the opposite direction.

Each of the links 6 is pivotally connected to the adjacent end portions of the friction band or brake sections 9 and, as is particularly illustrated in Figure 2, it is to be noted that one end of each band or brake section is pivoted inwardly of the adjacent end of the second band or brake section and that there is sufficient space between the band or brake sections to permit the same to rock. The links 6 operate as toggle links so that when the hub 3 is rotated in one direction the band or brake sections 9 will be expanded and when rotated in the opposite direction said band or brake sections will be contracted. When the sections 9 are expanded they frictionally engage the annular flange 10 arranged within the casing or housing A and carried by the wall thereof, said flange 10 being concentric to the hub 3.

The general construction and arrangement of the clutch mechanism just described is substantially the same as a similar structure embodied and claimed in my pending application Serial No. 293,200, filed April 28, 1919.

Bolted or otherwise secured, as at 11, to the peripheral portion of the plate 4 and extending toward and partially surrounding the inserted end portion of the driven shaft S is a housing or casing H. Said housing or casing H is preferably cylindrical in form so that the same may constitute a drum for a purpose to be hereinafter more particularly referred to.

The end portion of the housing or casing H remote from the hub 3 is closed by the end plate or head 12 preferably integral therewith and which is provided at its axial center with a hub 14 through which the driven shaft S is freely disposed. The housing or casing H, together with the plate 4 and hub 3, afford a member mounted upon both of the shafts D and S and in a manner whereby the shafts D and S and the member are capable of independent rotation or for rotation in unison in a manner which will now be described.

The inserted end extremity of the shaft D has fixed thereto a relatively broad gear 15. Meshing with the gear 15 are the diametrically opposed gears 16. Each of the gears 16 is fixed to a shaft 17 rotatably supported by a carriage 18. The carriage 18 is supported by the wall of the housing or casing H for sliding movement in a direction longitudinal of the shafts D and S.

The inserted end extremity of the shaft S has affixed thereto a gear 19 preferably of a greater radius than the gear 15. The gear 19 is in mesh with the gears 20, when the carriages are in one position, said gears 20 being each fixed to a shaft 17. By this means, the driving shaft D is operatively engaged with the driven shaft S and in a manner whereby the driven shaft S may be rotated at a speed less than the speed of the driving shaft D. The various gears just referred to may be of any desired ratios so that the ratio of speed between the driving shaft D and the driven shaft S may be as preferred.

Each of the carriages 18 is also provided with a relatively broad gear 21 constantly in mesh with a gear 16. When the carriages 18 are sufficiently moved in a direction inwardly of the shaft S, the gears 20 disengage from the gear 19 and the gears 21 are brought into mesh with the gear 19, resulting in a reverse rotation of the shaft S. When this reversing of the direction of rotation of the shaft S is required, a suitable clutching means generally indicated at 22 is employed to positively hold the housing or casing H against rotation. The mechanism as generally indicated at 22 may be of any type preferred and is adapted to be manually operated from a point exteriorly of the housing or casing A and may be of the construction indicated in my additional application executed on even date herewith.

23 denotes an actuating mechanism for the carriages 18 and which mechanism may be operated in any desired manner. I wish it to be understood that it is not my purpose to limit the present embodiment of my invention to this particular arrangement of gears or reversing mechanism just described as any conventional mechanism may be substituted therefor. I wish to state, however, that this particular arrangement and combination of gears and reversing mechanism is claimed in my application executed on even date herewith and which is a division of my pending application Serial No. 360,- 955, filed February 24, 1920.

Keyed or otherwise secured to the driven shaft at a point inwardly of the housing or casing H and in close proximity thereto is a disc or plate 24. The disc or plate 24 at diametrically opposed points is provided with the inwardly directed arms 25 of a length to extend inwardly of the housing or casing H along the major length thereof. The arms 25 are relatively broad and operatively engaged with said arms 25 at a plurality of points spaced longitudinally thereof are the clutching units C. Each of said units C is adapted for coaction with the housing or casing H, each of said clutching units in itself being of a tension insufficient to positively lock or hold the housing or casing H against rotary movement relative thereto but the combined action of said clutching units being sufficient to effect such action.

Each of the clutching units C comprises the band or brake sections 26, and end portion of one of said sections 26 being pivotally engaged, as at 27, with an arm 25 at one side of its transverse center, while an end portion of the second band or brake section is povitally engaged, as at 28, with a second arm 25 at the opposite side of its transverse center. The opposite or free end portion of each of the brake or band sections 26 is provided with an ear or extension 29 extending through a transversely disposed slot 30 formed in the adjacent arm 25.

Each of the arms 25 outwardly of the extensions or ears 29 is provided with a rock shaft 31 extending longitudinally of the arms 25 and rotatably supported by the bearings 32. Fixed to the shaft 31 are the cam members 33 of a number equal to the number of the extensions or ears 29 and each of said cam members 33 has separate coaction with a single one of said ears or extensions 29.

An end portion of each of the shafts 31 is provided with the laterally disposed arm 34 provided at its free end portion with a weighted member 35 so that under the centrifugal force created by the rotation of the disc and plate 24 with the shaft S, the arms 34 will move outwardly resulting in such rotation of the shafts 31 to cause the cams 33 to engage the ears or extensions 29 of the brake or band sections comprised in each of the clamping units to cause said band or brake sections to have the requisite frictional contact with the periphery of the housing or casing H whereby said casing or housing H may be caused to rotate in unison with the shafts D and S so that the speed of the driven shaft S will be increased. It will be understood that when the clamping action of the clutching units C is sufficient to hold the casing or housing H against rotation relative to said clutching units, the shaft S will rotate in high, but the rotation of the shaft S between high and low will depend upon the amount of slip the housing or casing H may have with respect to the clutching units C. In accordance with the amount of slip of the housing or casing H with respect to the clutching units C, the speed of the shaft S will be reduced above low. As before stated, the low speed of the shaft S occurs when the clutching units C are out of frictional or working engagement with the housing or casing H.

Upon starting of the motor, the shaft D rotates and at which time the clutching units C are in neutral or release and as the shaft D rotates, the shaft S is caused to rotate at a lower speed in the same direction through the operative connection afforded by the housing or casing H and the gear assembly carried thereby and coacting with the shafts D and S as hereinbefore set forth. During this period, the clutching mechanism comprising the band or brake sections 9 coacting with the annular flange 10 hold the housing or casing A against movement reverse to the direction of travel of the shaft S. As the speed of the motor increases dependent upon the load thereon, the shaft S will correspondingly increase in speed and as the disc or plate 24 rotates with said shaft S, the shafts 31 will be automatically rocked under the influence of the centrifugal force created by the weighted arms 34 to cause the brake or band sections 26 of the clutching units C to frictionally engage the periphery of the housing or casing H whereby said housing or casing H is caused to rotate in unison with the shafts D and S and in the same direction. The greater the frictional contact of the units C with the housing or casing H, the greater the rotating speed of the shaft S. In other words, when the clutching units C grip the casing or housing H in a manner to prevent rotation or slipping between said housing or casing H and the clutching units C, the shafts D and S will rotate at the same speed but this maximum or high speed will be correspondingly decreased in accordance with the extent or amount of slip or independent relative movement of the casing or housing H and the clutching units C, so that it is possible with my improved transmission to obtain automatically the different speeds between high and low and as may be required by the load of the engine.

The provision of a plurality of clutching units C in connection with a single or common rotatable element, constitutes an essential feature of my invention and particularly when each of the clutching units in itself is of a maximum tension or strength insufficient in itself to hold the housing or casing H against slipping or rotation relative to the clutching unit. However, by providing a number of clutching units of an aggregate or total tension to hold the casing or housing H against such relative rotation or slip, it has been fully demonstrated in practice that undue heating of the clutching units is eliminated and that the life thereof is materially prolonged because by having several separated elements, allowance is provided for more surface for radiation to the same amount of wear as would be the case if only a single clutching unit of requisite tension or strength was employed.

It is also to be understood that the cams 33 are so arranged upon the shafts 31 to coact with the extensions or ears 29 in a manner to cause all of the clutching units C to frictionally engage the housing or casing H at substantially the same moment, although should there be any slight or minute variation in the applications of these separate elements, the efficiency of the series of clutching units is not reduced.

While I have illustrated in the accompanying drawings the use of only three clutching units C, it is to be understood that any number may be employed which is found to best meet the requirements of practice and it is also to be understood that when desired these clutching units C may be in excess of the number of clutching units necessary to effect the positive locking or holding of the housing or casing H against movement or slipping relative to the clutching units C. The advantage of this resides in the fact that if from any cause any one of the clutching units should become deranged or otherwise unfit to function, the remaining elements will possess the requisite action to produce the desired result.

It is to be understood that in practice the casing A is substantially filled with oil so that the parts arranged therein may operate to greater advantage.

It is to be understood that the band or brake sections 26 comprised in the clutching units C are normally maintained substantially out of frictional contact with the casing or housing H and, as herein disclosed, this is accomplished by the retractile members or springs x.

From the foregoing description it is thought to be obvious that a power transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In a transmission mechanism, a driving shaft, a driven shaft, and means operatively connecting said shafts including a member constituting a drum, said member being loosely mounted on both of said shafts, a gear assembly carried by the member and co-acting with said shafts, a plurality of clutching units carried by one of the shafts and coacting with the member, and means operable under the influence of centrifugal force for bringing the clutching units into engagement with the member, each of said clutching units being in itself insufficient to materially hold the member for rotation with the shafts, the centrifugally operated means for bringing the clutching units into engagement with the member also permitting relative slip between the member and the clutching units to effect a variable speed to the shaft carrying the clutching units.

2. In a transmission mechanism, a driving shaft, a driven shaft and means operatively connecting said shafts including a member loosely mounted on both of said shafts, said member constituting a drum, a gear assembly carried by the member and coacting with said shafts, arms carried by one of the shafts and overlying the member at opposed points, clutching elements carried by said arms for coaction with the member and normally free therefrom, and means carried by the arms operable under the influence of centrifugal force for adjusting the clutching elements into frictional engagement with the member.

3. In a transmission mechanism, a driving shaft, a driven shaft and means operatively connecting said shafts including a member loosely mounted on both of said shafts, said member constituting a drum, a gear assembly carried by the member and coacting with said shafts, arms carried by one of the shafts and overlying the member at opposed points, clutching elements carried by said arms for coaction with the member and normally free therefrom, and means carried by the arms operable under the influence of centrifugal force for adjusting the clutching elements into frictional engagement with the member, each of said clutching elements being in itself insufficient to materially hold the member for rotation with the shafts.

4. In a transmission mechanism, a driving shaft, a driven shaft and means operatively connecting said shafts including a member loosely mounted on both of said shafts, said member constituting a drum, a gear assembly carried by the member and coacting with said shafts, arms carried by one of the shafts and overlying the member at opposed points, clutching elements carried by said arms for coaction with the member and normally free therefrom, and means carried by the arms operable under the influence of centrifugal force for adjusting the clutching elements into frictional engagement with the member, each of said clutching elements being in itself insufficient to materially hold the member for rotation with the shafts, the centrifugally operated means for bringing the clutching elements into engagement with the member also permitting relative slip between the member and the clutching elements to effect a variable speed of the shaft carrying the clutching elements.

5. In a transmission mechanism, a driving shaft, a driven shaft and means operatively connecting said shafts including a member loosely mounted on both of said shafts, said member constituting a drum, a gear assembly carried by the member and coacting with said shafts, arms carried by one of the shafts and overlying the member at opposed points, clutching elements carried by said arms for coaction with the member and normally free therefrom, means carried by the arms operable under the influence of centrifugal force for adjusting the clutching elements into frictional engagement with the member, each of said clutching elements being in itself insufficient to materially hold the member for rotation with the shafts, and automatic means for bringing the clutching elements into engagement with the member and also permitting relative slip between the member and the clutching elements to effect a variable speed of the shaft carrying the clutching elements.

6. In a transmission mechanism, a driving shaft, a driven shaft and means operatively connecting said shafts including a member loosely mounted on both of said shafts, said member constituting a drum, a gear assembly carried by the member and coacting with said shafts, arms carried by one of the shafts and overlying the member at opposed points, clutching elements carried by said arms for coaction with the member and normally free therefrom, means carried by the arms operable under the influence of centrifugal force for adjusting the clutching elements into frictional engagement with the member, each of said clutching elements being in itself insufficient to materially hold the member for rotation with the shafts, shafts carried by the arms, members carried by the shafts for contact with the clutching elements upon rocking movement of the shafts in one direction to force said clutching elements into frictional contact with the first named member, and means carried by the shafts operable under the action of centrifugal force for imparting said rocking movement thereto.

7. In a transmission mechanism, a plurality of shafts, one of said shafts constituting a drive shaft, and a second shaft constituting a driven shaft, an operative connection between said shafts, said connection including a member constituting a drum, said member being loosely mounted on both of said shafts, a gear assembly carried by the member and coacting with the shafts, a clutching medium carried by the driven shaft and coacting with the member, said clutching medium being normally free of the member, means for automatically causing the clutching medium to engage the member, and means for holding the member against rotation upon rotation of the drive shaft in one direction.

8. In a transmission mechanism, a plurality of shafts, one of said shafts constituting a drive shaft, and a second shaft constituting a driven shaft, an operative connection between said shafts, said connection including a member constituting a drum, said member being loosely mounted on both of said shafts, a gear assembly carried by the member and coacting with the shafts, a clutching medium carried by the driven shaft and coacting with the member, said clutching medium being normally free of the member, means for automatically causing the clutching medium to engage the member, and means for holding the member against rotation upon rotation of the drive shaft in one direction, the gear assembly being operative to cause the shafts to rotate at relatively different speeds.

9. In a transmission mechanism, a driving shaft, a driven shaft, and means operatively connecting said shafts whereby the driven shaft may rotate with the driving shaft at different speeds, said means including an element loosely mounted on the shafts, a gear assembly carried by the element and coacting with the shafts, clutching means carried by one of the shafts and coacting with the element to increase the rotation of the driven shaft at variable speeds, said clutching means comprising a plurality of units, each of said units in itself being insufficient to lock the member for substantial rotation with the shafts, and means for bringing the clutching units into engagement with the element, the means for bringing the clutching units into engagement with the element also permitting relative slip between the member and the clutching units to effect a variable speed of the shaft carrying the clutching units.

10. In a transmission mechanism, a driving shaft, a driven shaft, and means operatively connecting said shafts whereby the driven shaft may rotate with the driving shaft at different speeds, said means including an element loosely mounted on the shafts, a gear assembly carried by the element and coacting with the shafts, clutching means carried by one of the shafts and coacting with the element to increase the rotation of the driven shaft at variable speeds, said clutching means comprising a plurality of units, each of said units in itself being insufficient to lock the member for substantial rotation with the shafts, and centrifugal means for bringing the clutching units into engagement with the element.

11. In a transmission mechanism, a driving shaft, a driven shaft, and means operatively connecting said shafts whereby the driven shaft, may rotate with the driving shaft at different speeds, said means including an element loosely mounted on the shafts, a gear assembly carried by the element and coacting with the shafts, clutching means carried by one of the shafts and coacting with the element to increase the rotation of the driven shaft at variable speeds, said clutching means comprising a plurality of units, each of said units in itself being insufficient to lock the member for substantial rotation with the shafts, and means operating independently of the clutching units to hold the element against rotation in a direction reverse to the direction of rotation of the shafts.

12. In a transmission mechanism, a driving shaft, a driven shaft, and means operatively connecting said shafts whereby the driven shaft may rotate with the driving shaft at different speeds, said means including an element loosely mounted on the shafts, a gear assembly carried by the element and coacting with the shafts, clutching means carried by one of the shafts and coacting with the element to increase the rotation of the driven shaft at variable speeds, said clutching means comprising a plurality of units, each of said units in itself being insufficient to lock the member for substantial rotation with the shafts, and automatic means operating independently of the clutching units to hold the element against rotation in a direction reverse to the direction of rotation of the shafts.

13. In a transmission mechanism, a driving shaft, a driven shaft, and means operatively connecting said shafts whereby the driven shaft may rotate with the driving shaft at different speeds, said means including an element loosely mounted on the shafts, a gear assembly carried by the element and coacting with the shafts, clutching means carried by one of the shafts and coacting with the element to increase the rotation of the driven shaft at variable speeds, said clutching means comprising a plurality of units, each of said units in itself being insufficient to lock the member for substantial rotation with the shafts, and means common to all of the clutching units for bringing the same into engagement with the element.

In testimony whereof I hereunto affix my signature.

WILLIAM I. WHEELER.